(12) United States Patent
Heatwole et al.

(10) Patent No.: US 6,681,182 B2
(45) Date of Patent: Jan. 20, 2004

(54) FAULT DETECTION PSEUDO GYRO

(75) Inventors: Craig M. Heatwole, Redondo Beach, CA (US); Louis K. Herman, Palos Verdes, CA (US); Girard M. Manke, Huntington Beach, CA (US); Brian T. Hamada, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/061,499

(22) Filed: Feb. 1, 2002

(65) Prior Publication Data

US 2003/0149529 A1 Aug. 7, 2003

(51) Int. Cl.⁷ .............................................. G01B 11/26
(52) U.S. Cl. ................ 701/220; 356/139.01; 73/178 R
(58) Field of Search ................... 701/220, 13; 244/166, 244/171; 356/139.01; 250/559.37; 73/178 R

(56) References Cited

U.S. PATENT DOCUMENTS 5,308,024 A * 5/1994 Stetson, Jr. .................. 244/165
6,263,264 B1 * 7/2001 Herman et al. ................ 701/13

* cited by examiner

Primary Examiner—Marthe Y. Marc-Coleman
(74) Attorney, Agent, or Firm—Derrick Michael Reid

(57) ABSTRACT

A fault detection pseudo gyro emulates mechanical gyros by processing space system appendage measurement data and reaction wheel tachometer data within reference and control systems of a satellite to compute the vehicular bus angular velocity rate data by accounting for external torques, the momentum transfer between the satellite, the bus, and the appendages for providing accurate relative vehicular position and angular velocity rate data in an attitude reference and control systems now having accurate vehicular angular velocity rate data while enabling fault detection of hardware gyros and momentum sensors.

14 Claims, 3 Drawing Sheets

PSEUDO GYRO ATTITUDE REFERENCE SYSTEM

PSEUDO GYRO ATTITUDE REFERENCE SYSTEM

FAULT DETECTION PSEUDO GYRO

STATEMENT OF GOVERNMENT INTEREST

The invention was made with Government support under contract No. F04701-93-C-0094 by the Department of the Air Force. The Government has certain rights in the invention.

SPECIFICATION

Field of the Invention

The invention relates to the field of gyro referenced satellite systems. More particularly, the present invention relates to systems and methods for emulating gyros for improved reliability and lifetime of flight systems, as particularly described in U.S. Pat. No. 6,020,956 entitled Pseudo Gyro, Issued Feb. 1, 2000, and U.S. Pat. No. 6,263,264 entitled Pseudo Gyro with Unmodeled Disturbance Torque Estimations, both of which are here incorporated by reference as there fully set forth.

BACKGROUND OF THE INVENTION

A hardware gyro is used to provide vehicular bus rotational rates, that is, the angular velocity data used for vehicular attitude reference and attitude control. In order to accomplish controlled attitude orientation and controlled angular velocity of the satellite, the control system requires accurate attitude data from the reference system and accurate angular velocity rate data from the gyro. The gyro operation is subject to errors and biases that are corrected by a low frequency filter such as a Kalman filter in the attitude reference system. The low frequency filter is any filter that receives measurement data and produces update data with a low frequency bandwidth within a high bandwidth of the system operation. Hence, the gyro is an integral and essential part of an attitude reference system and is necessary for the proper functioning of the attitude control system. Modern applications require accurate, high bandwidth gyroscopes with long lifetimes, high reliability, and low power usage.

The appendage measurement data, reaction wheel tachometer data, and external torque rod current data define changes in momentum of the bus. These appendage measurement data, reaction wheel tachometer data, and external torque rod current data are momentum data related to the momentum of the spacecraft and processed by the attitude control system. This momentum data is available for momentum computational purposes. Gyros have accordingly long been used successfully in satellite attitude reference systems to provide the vehicular angular velocity rates of the satellite for satellite attitude referencing and positioning control. However, gyros are expensive and inherently have limited life times with low reliability and dynamic error characteristics, leading to premature failure of satellite systems.

U.S. Pat. Nos. 6,020,956 and 6,263,264 teach the use of a pseudo gyro realized by a software process to emulate the functions of a hardware gyro. The pseudo gyro uses the principle of conservation of momentum to compute the bus rate by accounting for the momentum from external torques and the transfer between a satellite bus and the appendages and momentum storage devices such as reaction wheels. The external torques, the appendage measurements, and reaction wheel tachometer data are used by the pseudo gyro to calculate the bus angular velocity rate. Accurate relative position and rate information are typically available from the attitude and appendage controllers on-board the satellite to facilitate these computations. The pseudo gyro is used as an integral part of an attitude reference system of a space satellite, but can be applied to other flight and space systems by replacing the hardware gyros. This pseudo gyro operates as part of the control and reference systems now having higher reliability, longer life times, lower power consumption, and more accurate angular velocity rates within high bandwidth operations. The pseudo gyro may operate concurrently with on board gyros that are subject to failure limiting the life of a spacecraft. The pseudo gyro does not detect errors in the conncurrently operating hardware gyros.

Hardware fault detection and resolution is extremely important to satellite operators. Time wasted resolving hardware anomalies results in payload outages and often endangers the safety of the spacecraft. For this reason, many satellites now include automated fault detection and redundancy management software. Gyros are key satellite attitude determination and control sensors. Unfortunately, existing fault detection software can not reliably detect a gyro failure when less than four gyros are operating simultaneously and fault detection software can not isolate the faulty gyro when less than five gyros are operating simultaneously. When the gyros are not properly oriented, up to six gyros may be required. Typical satellite attitude control and determination requires only three properly oriented gyros. Operating more than three gyros is undesirable for power and lifetime considerations. Therefore, sophisticated fault detection software, requiring more than three gyros, is not generally applied to detect gyro faults. A gyro failure on a commercial communications satellite lead to the loss of nominal attitude control resulting in major television network outage for the United States. Several hours are required to identify that a gyro failure caused the anomaly, determine which of the three gyros was in error, and swap the redundant gyro for the failed gyro. These and other disadvantages are solved or reduced using the invention.

SUMMARY OF THE INVENTION

An object of the invention is to provide a reference system in a flight or space system using an emulated gyro receiving the momentum data for estimating of external torque and to provide an estimate of an error in the external torque for emulating a gyro.

Another object of the invention is to provide fault detection of hardware gyros.

A further object of the invention is to provide fault detection of momentum sensors.

The invention is directed to a pseudo gyro software process to detect failure of operating hardware gyros. The pseudo gyro is preferably used as an integral part of an attitude reference system of a space satellite, but can be applied to other flight and space systems by replacing the hardware gyros. This pseudo gyro operates as part of the control and reference systems now having higher reliability, longer life times, lower power consumption, more accurate angular velocity rates within high bandwidth operations. The pseudo gyro is used to monitor gyro performance for fault detection. The pseudo gyro is extended to provide a fault detection of hardware gyros. The improved pseudo gyro provides an on-orbit functionality check of hardware gyros, provides an on-orbit performance check of hardware gyros, identifies the specific gyros with anomalous performance, functions with any number of hardware gyros, provides long term performance trending of hardware gyros, identifies anomalous performance of hardware used in the pseudo gyro solution such as stepper motors, encoders, angular orientation sensors, tachometers, and reaction wheels. These and other advantages will become more apparent from the following detailed description of the preferred embodiment.

DETAILED DESCRIPTION OF THE PREFERRED EMBODIMENT

Figure 1:
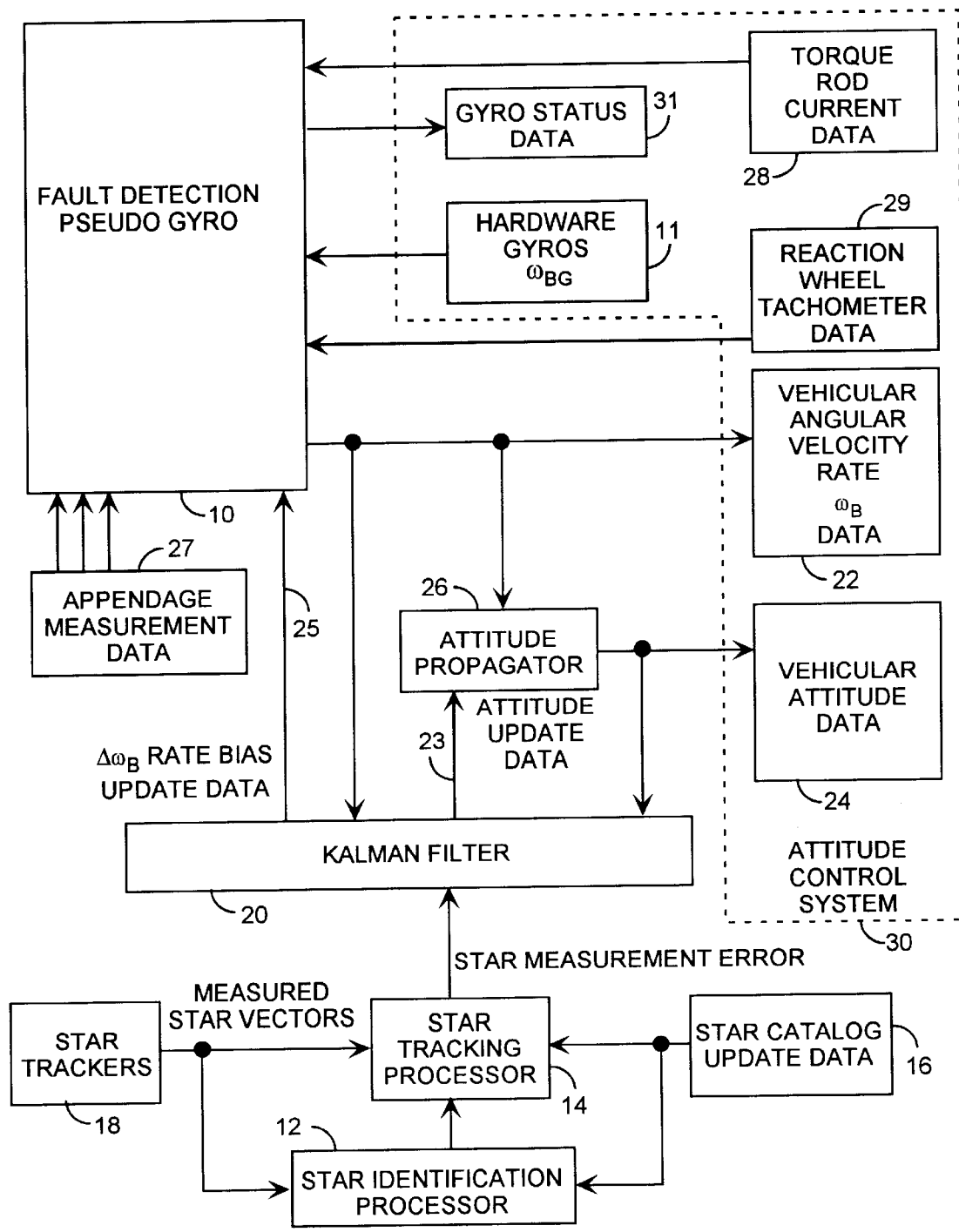
FIG. 1 is a block diagram of a pseudo gyro attitude reference system.

An embodiment of the invention is described with reference to the figures using reference designations as shown in the figures. Referring to FIG. 1, the pseudo gyro attitude reference system uses conventional system inputs, and processes with the improvement being the pseudo gyro 10 replacing conventional hardware gyros. The pseudo gyro 10 is a fault detection pseudo gyro that can receive gyro angular velocity data ωBG from hardware gyros 11. The reference system includes a star identification processor 12 for selecting an identified star from the star catalog 16 communicated to a star tracking processor 14 from a ground station, not shown. The star identification processor 12 receives measured star vectors from the star trackers 18 and compares these measured star vectors to star catalog orientation data to identify stars tracked by the star trackers 18. The star tracking processor 14 receives star catalog ground update data 16 including the star orientation data, receives an identified star data from the star identification processor 12 and receives measured star vectors from star trackers 18, for providing star measurement error data to a Kalman filter 20. The Kalman filter 20 receives the measured star measurement error data from the star tracking processor 14, receives vehicular angular velocity rate data 22 from the pseudo gyro 10, and receives vehicular attitude data 24 from an attitude propagator 26 for providing bias update data 25 communicated to the pseudo gyro 10, and for providing attitude update data 23 to the attitude propagator 26. The pseudo gyro 10 also receives appendage measurement data 27 of attached appendages, not shown, from an appendage control system, not shown. The attached appendages, not shown, such as exemplar communication antenna assembly and two solar panels are used in the preferred form, but other appendages, such as attached payloads, could be used as well, all of the appendages have measurement devices such as encoders or resolvers for generating the appendage measurement data 27 as momentum data. The three appendages have encoders that measure appendage position relative to the bus. The pseudo gyro 10 also preferably receives reaction wheel tachometer data 29 communicated from an attitude control system 30. The control system 30 may receive hardware gyro status data 31 from the fault detection pseudo gyro 10. Attached appendages including operational encoders and resolvers, and reaction wheels, not shown, are all well known by those skilled in the art of satellite system designs. The reference system, including star trackers 18, star identification processors 14, star tracking processors 14, star catalog update data 16, Kalman filter 20, and attitude propagators 26 for supplying vehicular angular velocity rate data 22 and vehicular attitude data 24 to an attitude control system 30 are also well known by those skilled in the art of satellite system designs.

The pseudo gyro 10 provides an improvement in the construction, operation and accuracy of the attitude reference system. Significantly, the pseudo gyro 10 uses momentum data such as appendage measurement data 27, reaction wheel tachometer data 29 and torque rod current data 28 for generating vehicular angular velocity rate data 22 as a software emulation replacement of a conventional hardware gyro, not shown. The vehicular angular velocity rate data 22 is based on on-board computer calculations for emulation of the replaced hardware gyro. The pseudo gyro 10 provides inertial vehicular angular velocities rate data 22 as an inherent component of the spacecraft inertial reference system. The pseudo gyro 10 functions as a direct replacement to the inertial hardware gyro in the same position in the reference system but now preferably receiving appendage measurement data 27, reaction wheel tachometer data 29, and torque rod current data 28 for direct emulation of the hardware gyro. The pseudo gyro 10 functionally replaces or can optionally operate in tandem with the hardware gyro so that either the hardware gyro or a pseudo gyro 10 may be used to provide redundant inertial vehicular angular velocity rate data 22 for improved attitude control, reliability, or extended lifetime.

Figure 2:
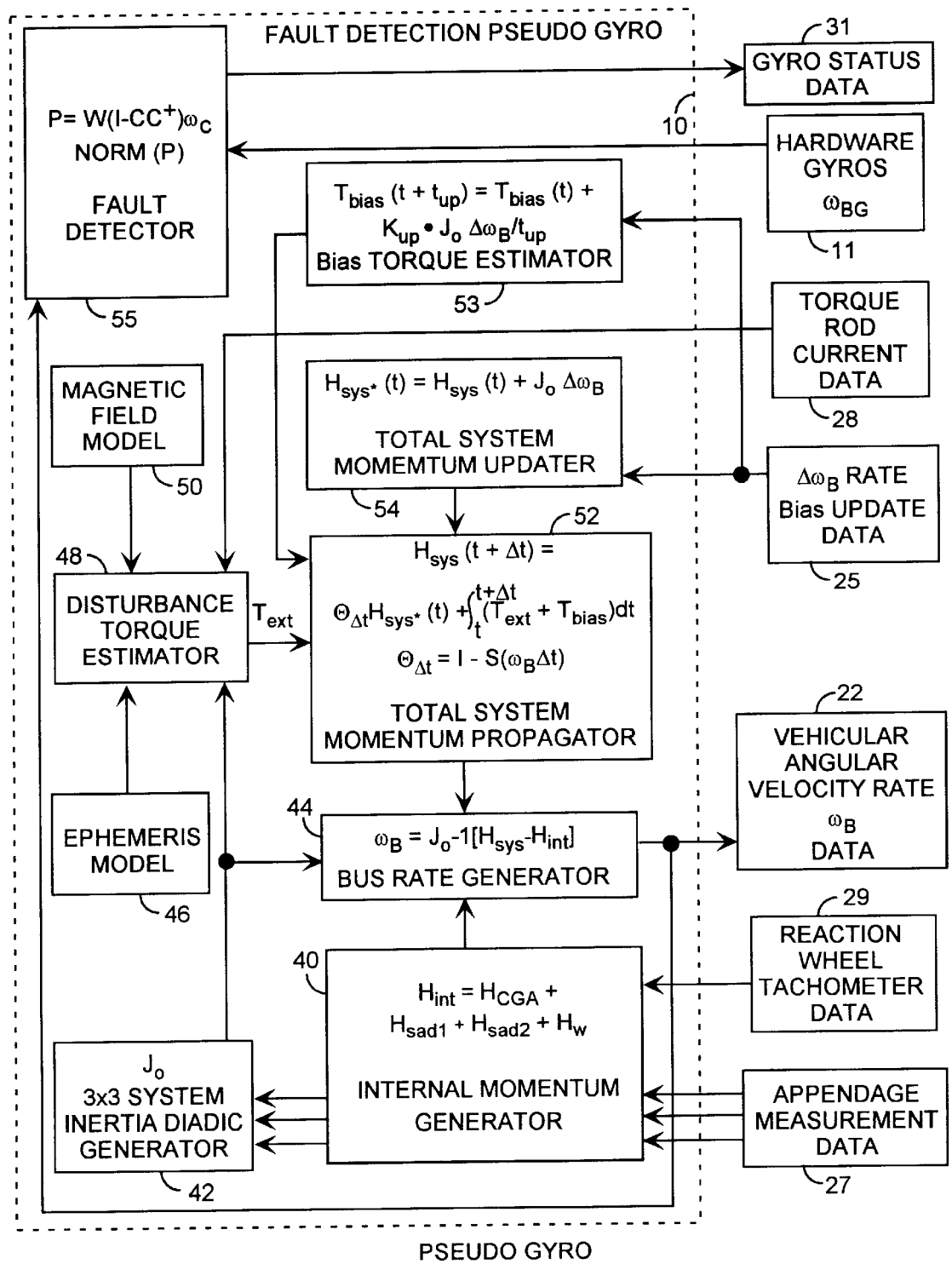
FIG. 2 is a block diagram of the pseudo gyro shown receiving appendage measurement data for computing angular velocity.

Referring to FIGS. 1 and 2, and more particularly to FIG. 2, the pseudo gyro 10 receives appendage measurement data 27 from an appendage control system, not shown, reaction wheel tachometer data 29 from the attitude control system 30, and bias update data 25 from the Kalman filter 20, and provides vehicular velocity rate data 22 to the attitude control system 30. In the exemplar form, the pseudo gyro 10 is applied to the exemplar multiple bodied spacecraft preferably comprising three appendages including the two solar array drives, a communication gimbaled assembly, and a set of reaction wheels, all not shown. The appendage control system, also not shown, provides the appendage measurement data 27, comprising solar array appendage data sad1 and sad2 and communication gimbaled assembly appendage measurement data cga while the attitude control system 30 provides reaction wheel tachometer data w 29 for generating the vehicular angular velocity rate data 22 communicated back to the attitude control system 30. Hence, the exemplar spacecraft has three attached appendages providing solar array data sad1 and sad2 and communication gimbaled assembly data cga, has a set of reaction wheels for generating reaction wheel data 29, and torque rods for generating torque rod current data 28.

The pseudo gyro 10 generates the vehicular angular velocity rate data 22 based on computer calculations on-board the spacecraft. The pseudo gyro 10 computes internal momentum data 40 Hcga, Hsad1, Hsad2 and Hw using appendage measurement data 27 and the reaction wheel tachometer data 29. An inertia diadic generator 42 computes system inertia diadic data Jo based on the appendage measurement data 27. The inertia diadic data Jo from the generator 42 and the internal momentum data Hint from the internal momentum generator 40 and total system momentum data Hsys from the total system momentum updater 54 are communicated to a bus rate generator 44 for generating the vehicular angular velocity rate data 22. The inertia diadic data Jo from the generator 42 is also communicated to a disturbance torque estimator 48 that receives magnetic field data from a magnetic field model 50, receives ephemeris data from an ephemeris model 46, and receives torque rod current data 28 from the attitude control system. The disturbance torque estimator applies the Jo inertia diadic data and torque rod current data to the magnetic field model and ephemeris model for generating external torque data Text. The disturbance torque estimator 48 computes and communicates the external torque data Text to a total system momentum propagator 52 receiving updated system momentum data Hsys* from a total system momentum updater 54 that in turn receives bias update data 25 from the Kalman filter 20. The total system momentum propagator 52 computes the total system momentum Hsys communicated to the bus rate generator for computing the vehicular angular velocity rate data 22.

A bias torque estimator 53 also receives the rate bias update data and computes an estimate of an error in the estimated external torque Text. Tbias is the estimate of the error in the estimated external disturbance torque Text. The term t is the running time and tup is the time interval between Kalman filter updates of filter 20. The Tbias estimator error is equal to the prior estimated error Tbias at time t plus an incremental update. The incremental update is equal to Kup*Jo*ΔωB divided by the time interval tup. The estimate of the external torque error Tbias is received by the total system momentum propagator 52 for updating the total system momentum Hsys as an update to the estimated external torque Text. Errors in the estimated torque result from uncertainties in the calculated amount of external disturbance torque Text. These uncertainties include unknown satellite dipoles, errors in the magnetic field model, and other general uncertainties in the external torque estimate Text, for example, uncertainties resulting from wind solar pressure, aerodynamic drag torques, electronic transmission reactions, and satellite fluid flows.

The bias torque estimator 53 provides a running averages of the error in the Text. A non-zero mean of the rate bias update data 25 indicates that there is an error in the estimated external torque Text because the disturbance torque estimator is the only source of momentum added to the total system momentum and because the rate bias update data 25 will indicate over time an error in the system momentum. By computing an estimate in the error of the torque estimate, the pseudo gyro can account for imprecise external torque estimates for many possible error sources.

In the preferred form, the pseudo gyro 10 uses the magnetic field model 50 and the ephemeris model 46 for determining gravity external torques and magnetic external torques. In this embodiment the disturbance torque estimator 48 requires a model for determining external torques, such as the ephemeris model 46 or the magnetic model 50, or preferably both, but other models and measurements could be used, such as gravity gradient models, solar pressure models, aerodynamic drag models, and magnetometer data. The models 46 and 50 may be mathematical models or a compilation of measurement data. Disturbance torque models are used by the external torque estimator 48 for generating the external torque Text by applying the inertia diadic Jo and related torque data, if any, such as torque rod current data 28 and the models 46 and 50. These external torques Text are calculated based on the magnetic field model 50 of the earth and the ephemeris model 46 describing the satellite orbit, including the position and linear velocity of the spacecraft, and based upon torque rod current data 28 and magnetic field model data 50. The disturbance torque estimator 48 receives torque rod current data 28, ephemeris model 46, and magnetic model 50 for computing the external torque Text.

Pseudo gyro emulation is based on the principle of conservation of momentum of the spacecraft as an integrated composite system. The operation of the pseudo gyro 10 is based on the principle that the total system momentum Hsys of the spacecraft is the sum of the momentum of all of the component parts. The momentum of the bus is not known, but can be calculated from the total system momentum and the momentum of the reaction wheels and attached appendages. Determining the partial momentum of the reaction wheels and attached appendages requires momentum data indicated by angles and commanded rates of appendage measurement data 27 and by reaction wheel tachometer data 29. The momentum of the bus is equal to the total system momentum Hsys minus the momentum data Hcga, Hsad1 and Hsad2 of the attached appendage and minus the momentum data Hw of the reaction wheels. The total system momentum Hsys can be calculated from the previous iteration of Hsys generated values and from changes in the external torques Text over a predetermined iteration time period Δt. The total system has constant momentum in the inertial space coordinate frame unless changed by external torques Text. After each Kalman filter update, the total system momentum updater 54 computes the updated total system momentum Hsys* from previously computed values of the total system momentum Hsys, the inertia diadic data Jo and the bias update data 25 from the Kalman filter 20. The total system momentum Hsys is then computed by propagator 52 using the updated total system momentum Hsys* and by the external torques Text on the system.

The total system momentum Hsys 52 of the entire vehicle is a function of the external torque Text and a body-axis inertial momentum θHsys*. Hsys* is the updated total system momentum computed 54 from the previous total system momentum computation. The momentum propagator 52 and the momentum updater 54 are specified in vector-matrix form in a three dimensional space. Changes in the total system momentum Hsys are computed by adding the integration of the external torques Text to the body axis inertial momentum θHsys*. The attitude transformation matrix θ is equal to an identity matrix I minus a skew operator S specified as a function of the vehicular angular velocity rate ωB data 22 and Δt. Due to the motion of the vehicle body relative to inertial space, the total system momentum Hsys is updated every computation cycle at time t. The body axis inertial momentum θHsys* is the product of an incremental attitude transformation matrix θ and the previously computed updated total system momentum Hsys* 54. Propagating the updated total system momentum Hsys 52 is a propagation of the total system momentum at time t to time t+Δt. The total system momentum Hsys is revised and corrected 54 periodically to reflect rate corrections ΔωB using the inertia diadic data Jo from generator 42 and rate bias update data 25 from the Kalman filter 20. When Kalman filter updates are unavailable, Hsys*=Hsys 54. The updated total system momentum Hsys* from the updater 54 is communicated to the total system momentum propagator 52 that then computes the total system momentum Hsys at time t+Δt. The total system momentum Hsys is communicated to the bus rate generator 44 for computing an updated vehicular angular velocity rate 22. The vehicular angular velocity rate 22, that is, the bus rotational rate ωB is equal to the inverse matrix of the inertia diadic data Jo multiplied by the matrix subtraction of the total system momentum Hsys minus the internal momentum Hint, as a momentum balance relationship. The internal momentum Hint is equal to the sum of the communication gimbaled assembly momentum Hcga plus the first solar array device momentum Hsad1 plus the second solar array device momentum Hsad2 plus the reaction wheel momentum Hw and is computed by the internal momentum generator 40 from the reaction wheel tachometer data 29 and the appendage measurement data 27. This internal momentum Hint is used with the total system momentum Hsys for generating the bus angular velocity $\omega B$. Hint is expressed in the bus coordinate frame as opposed to a local appendage coordinate frame.

The pseudo gyro 10 is dependent on the mass properties of the vehicle system including all the attached appendages as specified by the inertia diadic data Jo. The matrix Jo is the system inertia diadic and is calculated as a function of the appendage measurement data 27 expressed in angles. The matrix data Jo is the inertia tensor or inertia diadic of the system and is represented for computational purposes as a three by three matrix. The diadic data Jo contains data indicating the principal axes of inertia and includes the attached appendages and is used to determine the gravity gradient external torques Text on the vehicle. The momentum balance relationship of the bus rate generator 44 specifies the basic operation of the pseudo gyro 10 and is given as $\omega B = JoE-1\times[Hsys-Hint]$ where JoE-1 in the inverse of Jo and Hint is given as the sum of all the momentum Hcga, Hsad1, Hsad2 and Hw of all the internal momentum sources such as the reaction wheels and the appendages.

The total system momentum Hsys is constant unless changed by external torques Text on the vehicle system. These external torques 48 are calculated based on a magnetic field model 50 of the earth and an ephemeris model 46 that provides linear position and velocity data of the vehicle. The disturbance external torques applied to the vehicle may be considered the most uncertain. However, the disturbances due to gravity gradient torques are well known. Because the earth magnetic field can be measured or modeled accurately on-board using the high order models 50 that are known to those skilled in the art, the magnetic field torques can be accurately computed as part of the external torques 48. External magnetically induced torques are caused by the torque rods in which current carrying coils produce external torques by magnetically interacting with the earth magnetic field. The external torques Text also includes torques due to gravity gradients. Gravity gradient torques are caused by gravity acting to align the principal axes of inertia with the gravity vector directed to the earth center. Gravity gradient torques are dependent on the vehicle attitude relative to the earth gravity vector. The external torques are then integrated to produce a measure of the change in system momentum Hsys. The relative appendage momenta Hcga, Hsad1 and Hsad2 are also well known through predetermined well-known mass properties of the appendages, through data from the appendage encoders, and from the stepper motors driving the appendages at predetermined known angular stepping rates.

The operator S is a skew-symmetric operator and has the form of a three by three matrix and is defined as $S(V)=[0-vz\ vy;\ vz\ 0-vx;\ -vy\ vx\ 0]$, where $V=[vx\ vy\ vz]$ is transposed. The process of transforming the total system momentum incrementally into the bus coordinate frame can also be described by the sum of the previous momentum in the bus frame plus the cross product of incremental rotation $\omega B\Delta t$ and total system momentum Hsys. The integral of the cross product is equivalent to a small angle of rotation of the system momentum. The appendage momentum Hcga is the product of Jcga and dcga/dt where Jcga is a three by three inertia matrix and dcga/dt is the time derivative rate of change of the communication gimbaled assembly momentum Hcga. The inertia matrix Jcga has embedded in it a transformation to provide the relative communication gimbaled assembly momentum Hcga in the bus coordinate frame. Similar relationships are used for the remaining components of the appendage momentum Hsad1, Hsad2 and Hw.

The solution of the momentum balance equation, Hsys=Jo multiplied by $\omega B$+Hint for the bus vehicular angular velocities rate $\omega B$ requires the inverse of the system inertia diadic matrix Jo. The inverse of the Jo matrix is trivial in the three by three matrix space and the inverse Jo matrix can be determined analytically and as such is not a significant computational burden to the spacecraft computer. The solution for the bus angular velocities is given as $\omega B=JoE-1\times[Hsys-Hint]$ by the generator 44. The momentum balance equation of the bus rate generator 44 is not corrupted by the lack of knowledge of inter-body friction torques. The system inertia diadic matrix Jo and the inverse matrix of Jo are predetermined to be known accurately, but because the system mass is large and does not change rapidly, the Jo generator 52 computational rates are slowed to less than one hertz to reduce the computational load in the on-board processors.

The pseudo gyro 10 operates in combination with the Kalman filter 20 providing bias rate update corrections 25. Preferably, a six state Kalman filter 20 provides update corrections to both the attitude propagator 26 by generating attitude update data 23 and to the pseudo gyro 10 by generating bias rate update data 25. The rate bias $\omega B$ update data 25 is based on inertially fixed stars. The rate bias update data 25 is produced at a frequency of 1.5 hertz by the on-board Kalman filter 20. While the majority of the computations in the pseudo gyro 10 occur at twelve hertz, the correction to total system momentum Hsys will only occur when a Kalman filter bias rate update data 25 is generated. The computer update rate on computations 42, 44, 46, 48, 50 and 52 is preferably twelve hertz, whereas the update rate for the updater 54 is at 1.5 hertz, and the update rate for the inertia diadic Jo 42 is 0.1 hertz. The total system momentum updater 54 provides Hsys* to the total system momentum propagator 52 at a 1.5 hertz rate. The previous value of total system momentum Hsys at time t is used at the twelve hertz rate to propagate the total system momentum Hsys to the new time $t+\Delta t$ except when the Kalman filter 20 provides bias rate data 25 and attitude update data 23 at the 1.5 hertz rate. The pseudo gyro computations are compatible with available computer processing speeds offering inherently fast operational computation bandwidths.

In some space missions, such as interplanetary space missions, the spacecraft may not be subjected to significant gravity gradients and external magnetic fields, and therefore, the spacecraft would not be subjected to significant external torques. Also, during suspension periods within a space mission, external torque computation processing may be suspended or intermittently not used. During these interplanetary space missions and suspension periods, the ephemeris model 46, the magnetic field model 50, the disturbance torque estimator 48 and the torque rod current data 28 would not be used as the external torque Text would be insignificant. Hence, in one form of the invention, the pseudo gyro 10 may only use the updater 54, propagator 52, bus rate generator 44 and the internal momentum generator 40. Minimally, the pseudo gyro 10 must include at least an internal momentum generator 40 receiving momentum data, such as, data 27 and 29, a diadic generator 42 for generating the inertia diadic Jo, and the momentum propagator 52 for computing the total system momentum when the orientation of the spacecraft changes causing a change in the skew symmetric matrix $S(\omega B\Delta t)$. Further still, during periods of low power consumption, such as when powering down the star trackers, the bias rate update data 25 may no longer be generated by the Kalman filter 20 such that the total system momentum updater 54 is not used, and the propagator 52 functions with a constant value of total system momentum Hsys in inertial space. During such periods of low power consumption, suspension, or interplanetary operation, with no applied external torques, the pseudo gyro 10 would minimally include generators 40, 42, 44 and 52 for receiving some momentum data, such as data 27 and 29, and for generating the vehicular angular velocity rate data 22. Furthermore, the pseudo gyro 10 has wide application to any moving vehicular system having attitude control using angular velocity rate data.

Reference systems using pseudo gyros have been evaluated by computer simulation as indicated by exemplar low and high gains constituting a preferred range of Kalman filter operation. These Kalman filter gains and time constants are practical for spacecraft applications, but other gains and time constants may be well suited for other types of spacecraft, inertial guidance and control applications. Kalman filter gains and time constants are preferably optimized for error sources. The error sources include system inertia diadic error Jo, communication antenna to bus coupling inertia error, reaction wheel alignment error RWA, an electromagnetic torque scale factor error EMT, and a magnetic field model error EMF. These error sources cause errors in the vehicular angular velocity rate output 22 of the pseudo gyro 10. The pseudo gyro 10 requires specified parameters to function properly and these parameters affect the accuracy of the pseudo gyro 10.

These parameters include the momentum of individual reaction wheels Hw acquired through the use of reaction wheel tachometer data 29, reaction wheel alignment data initially acquired through ground measurements, the system inertia diadic data Jo also initially acquired through ground measurements for the Jo system diadic data generator 42, stepper motor command rates for the attached appendages, and the appendage angles as appendage measurement data 27 as acquired by encoders of the attached appendages. These error sources and parameters are well known by those skilled in the art. The vehicular attitude data 24 from the attitude propagator 26 includes Roll, Pitch and Yaw angles. The pseudo gyro 10 performance is sensitive to errors in the system inertia Jo and the amount of momentum stored in the reaction wheels, the inertia of the communication gimbaled assembly appendage, the reaction wheel alignment, the alignment of the electromagnetic torques, and external magnetic fields applied to the magnetic field model. The positive and negative errors in the Roll, Pitch, and Yaw axes of the exemplary pseudo gyro are sensitive to each of the error sources. The momentum of the individual reaction wheels and the commanded rates to the stepper motor, and the appendage angles are assumed to be accurately known for computing the vehicular attitude data 24 in the performance table verifying the operation of the exemplar form.

The pseudo gyro 10 is used to provide accurate vehicular angular velocity rate data 22 and accurate attitude data 24. Attitude data 24 is more accurate when the star trackers 18 are tracking stars. When either one of the star trackers 18 is not tracking a star, the bias update data 25 from the Kalman filter 20 is degraded when tracking one star or not computed when not tracking any star. When either tracker 18 has started tracking stars, the Kalman filter bias rate update data 25 is used to update the total system momentum Hsys to compensate for the errors from the error sources. When both trackers 18 are not tracking a star, the accuracy of attitude data 24 degrades. The extent of the attitude data degradation is revealed by the values in the performance table. The performance table reveals a sensitivity analysis that injects errors in turn and reports the corresponding vehicular attitude data 24 using a simulation model of the multiple bodied spacecraft vehicle used in the preferred form. This simulation model includes models of the encoders, the stepper motors, the reaction wheels, and the tachometers.

The pseudo gyro 10 emulates hardware gyros by computer processing of momentum data using principles of conservation of momentum by accounting for the momentum transfers between the bus and the appendages and by accounting for applied external torques for providing accurate vehicular angular velocity rate data 22 as an integral part of the attitude reference system for also generating highly accurate vehicular attitude data 24 within high bandwidth operations, higher reliability, longer life times and lower power consumption.

Figure 3:
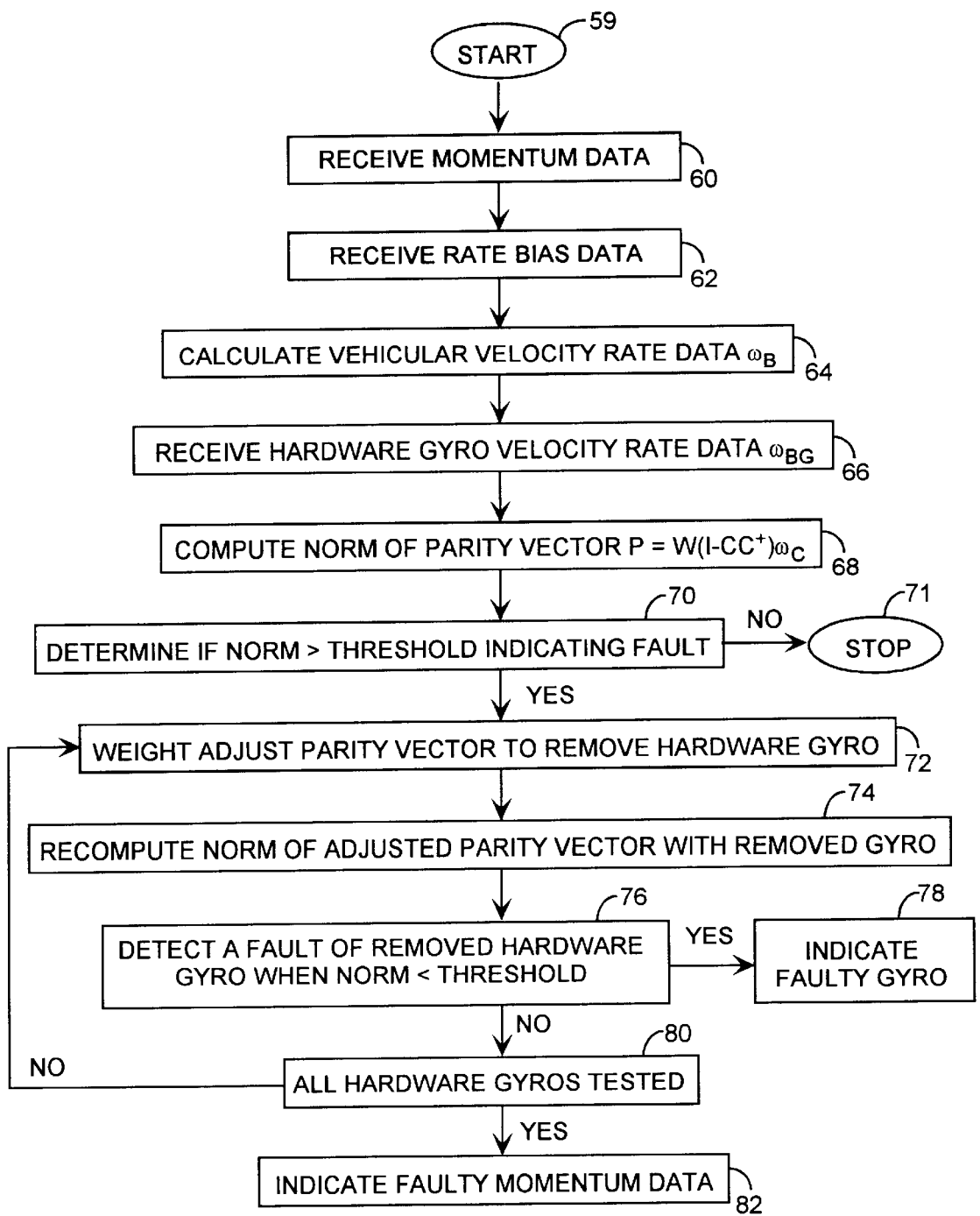
FIG. 3 is a flow diagram of a pseudo gyro fault detection process.

Referring to all of the Figures, and more particularly to FIG. 3, the pseudo gyro can be implemented as a fault detection pseudo gyro 10 using computer processes. The fault detection pseudo gyro uses the principal of conservation of momentum and knowledge of the disturbance torques to accurately determine the angular velocity of a spacecraft. The fault detection pseudo gyro applies to spacecraft controlled by any momentum storage device including but not limited to reaction wheels, momentum wheels, and control moment gyros. The fault detection pseudo gyro also applies to a spacecraft controlled by mass expulsion such as reaction jets when the torques produced by the reaction jets are firstly characterized. Also, the fault detection pseudo gyro works on spacecraft with or without articulated appendages.

The fault detection pseudo gyro algorithm models all significant disturbance torques Text acting on the spacecraft. External torques include atmospheric drag, solar torques, magnetically induced torques, and gravity gradient torques. Errors in disturbance torque modeling significantly impact attitude determination performance during star gaps and outages. The fault detection pseudo gyro algorithm allows star updates and the Kalman filter to correct errors due to external torque modeling errors. After calculating the external torques, the external torques are integrated as $\int \text{Text}(dt)$.

The system momentum Hsys is calculated from a momentum balance equation that includes the momentum from all appendages and momentum storage devices Hint and the integrated external torques $\int \text{Text}(dt)$. Using Hint, the momentum in the bus or central body of the spacecraft Hsys-Hint is calculated. The inertia of the system Jo is calculated based on measured masses, inertias and mass center locations and the appendage angles of all attached articulated appendages. Appendages include solar arrays, communication antennas, and payloads. The mass properties are calculated prior to launch or may be estimated on-orbit. Finally, the spacecraft angular velocities $\omega$B are obtained by inverting the 3×3 system mass matrix Jo and calculating a product with the momentum Hsys-Hint in the bus.

The fault detection pseudo gyro function operates in conjunction with an estimator such as the Kalman filter. The Kalman filter produces a correction for angular velocity $\Delta\omega$B. The pseudo gyro periodically updates knowledge of the system momentum based on the angular velocity corrections from the Kalman filter. These updates prevent the pseudo gyro from accumulating errors that could reduce accuracy when left uncorrected. When unmodeled external torques are present, the momentum updates from the Kalman filter in terms of $\Delta$H will have a consistent non-zero value or bias, where $\Delta H = J_o \Delta \omega B$. By adding three states to the pseudo gyro for x, y, z torques, the bias torque Tbias can be calculated and incorporated into the total system momentum Hsys from the system momentum propagator. The gain Kup of bias torque estimator is chosen to adequately track changes in external torque while maintaining overall performance and stability.

The pseudo gyro fault detection method performs a parity check on the spacecraft angular velocities $\omega$B as calculated by the pseudo gyro and the body angular velocities ωBG from the hardware gyros. Parity is calculated using $P = W(I - CC^+)\omega c$, where $C^+ = (C^T W C)^{-1} C^T W$, where W is a diagonal weighting matrix of ones and zeros, ωc is a vector of combined angular velocities of the pseudo gyro and hardware gyros, C is the gyro input axis orientation matrix, and $C^+$ is the weighted pseudo inverse of C. The pseudo gyro vehicular angular velocity rate data ωB and the hardware gyro vehicular angular velocity rate data ωBG are combined into an angular velocity rate data vector ωc. The correlation matrix is computed by correlation multiplying the correlation matrix $(I - CC^+)$ by the angular velocity rate data vector ωc for generating a parity vector (P). Then, the norm is computed by norm computing a norm of the parity vector (P). When all of the angular velocities ωc are in agreement, the norm of the P vector will be less than a predetermined threshold value. The threshold value is a function of the hardware gyro noise and the pseudo gyro errors. To check the performance of the hardware gyros, the weighting matrix is set to ones, the P vector is calculated, and a P norm is evaluated. When the norm of P is greater than the threshold value, the spacecraft has experienced an anomaly. In order to determine whether a particular hardware gyro has experienced the anomaly, the P vector is calculated with the gyro under test removed. Each gyro is removed from the parity matrix calculation in turn, and the norm of P is recalculated. The gyros are removed from the parity matrix calculation by setting the diagonal element of the W matrix associated with that gyro to zero. By removing each gyro in turn, a faulty gyro will be identified. When the successive removal of all the hardware gyros does not result in the norm of the parity vector being less than the threshold, then the pseudo gyro is in error as a result of an anomalous measurement for one of the pseudo gyro inputs. When no faulty gyro is detected, then the pseudo gyro is providing faulty data indicating an error in the momentum devices and sensors such as the stepper motor, reaction wheel or angular position sensor. When removing a faulty gyro from the parity equation, if the norm of P is again under the threshold value the removed hardware gyro is the malfunctioning gyro. Hence, removing each gyro in succession from the parity equation will identify the failed gyro. After the failed hardware gyro has been identified, redundancy management software can select a spare hardware gyro or use the pseudo gyro solution for attitude determination. Thus, the improved pseudo gyro system has identified a separate spacecraft hardware anomaly to which correction action can be applied.

Referring to FIG. 3, the fault detection process starts 59 by receiving momentum data 60 and rate bias data 62 for calculating 64 the vehicular velocity rate data ωB. Hardware gyro vehicular velocity rate data ωBG is received 66 and the norm of the parity vector P is calculated 68 and compared to a threshold. When the norm is less than the threshold, no fault is detected and the process can stop 71. When a fault is detected, the weighting matrix W is adjusted 72 to remove one of the hardware gyros for the recomputation. The adjusted norm of the adjusted parity vector is recomputed 74. The adjusted norm is compared to the threshold. When the adjusted norm is less than threshold, indicating no error when a hardware gyro is removed by weighting adjustment, then the removed hardware gyro is deemed faulty and the process indicates 78 the detected faulty hardware gyro. When the adjusted norm is greater than the threshold, indicating an error, then the weighting adjustment 72 adjusts the parity vector to remove the next successive gyro. The recomputation 74 is repeated 80 for each of the hardware gyros tested. When a fault has been determined 70 by the computation of the unadjusted norm of the parity vector, yet none of the hardware gyro were detected 76 to be faulty, then the momentum data is deemed defective and the process indicates faulty momentum data 82. In this manner, all hardware gyros can be tested against pseudo gyro computations, indicating either a faulty hardware or momentum data in the event of discrepancy between the pseudo gyro and the hardware gyros.

Commercial satellite operators who have experienced hardware gyro failures have expressed substantial interest in the pseudo gyro as a method to recover satellite mission capability. This new feature extends the usefulness of the pseudo gyro to satellite operators who have yet to experience a hardware gyro failure. Regardless of the number of hardware gyros in use, the pseudo gyro fault detection algorithm will identify a faulty gyro, and the gyro can be autonomously removed from attitude determination and control, and engage a spare hardware gyro or a pseudo gyro for uninterrupted payload operation. This replacement use makes the pseudo gyro valuable to commercial satellite operators who desire seamless payload operations in the presence of hardware anomalies. Those skilled in the art can make enhancements, improvements and modifications to the invention. However, those enhancements, improvements and modifications may nonetheless fall within the spirit and scope of the following claims.

What is claimed is:

1. A method of detecting a fault of one or more hardware gyros in a vehicle having momentum sensors, the method comprising the steps of, receiving momentum data from the momentum sensors, calculating pseudo gyro vehicular angular velocity rate data from the momentum data, receiving hardware gyro vehicular angular velocity rate data from the hardware gyro, computing a norm of a vector from the hardware gyro vehicular angular velocity rate data and the pseudo gyro vehicular angular velocity rate data, and determining when the norm of the vector indicates a faulty one of the hardware gyros.

2. The method of claim 1 wherein the vector is a weighted vector for indicating the hardware gyros.

3. The method of claim 1 wherein the vector is a product of a correlation matrix and an angular velocity rate data vector.

4. A method of detecting a fault of one or more hardware gyros in a vehicle having momentum sensors, the method comprising the steps of, receiving momentum data from the momentum sensors, calculating pseudo gyro vehicular angular velocity rate data from the momentum data, receiving hardware gyro vehicular angular velocity rate data from the hardware gyros, computing a norm of a parity vector from the hardware gyro vehicular angular velocity rate data and the pseudo gyro vehicular angular velocity rate data, determining when the norm of the parity vector is greater than a threshold indicating a fault, recomputing the norm of the parity vector with the hardware gyro vehicular angular velocity rate data of one of the gyros is removed from the recomputation of the parity vector, and detecting when the norm of the recomputed parity vector is less than the threshold for indicating that the removed hardware gyro is faulty.

5. The method of claim 4 wherein, the momentum data comprises torque rod current data, reaction wheel tachometer data, and appendage measurement data.

6. The method of claim 4 further comprising the steps of, receiving rate bias update data, the calculating step calculating the pseudo gyro vehicular angular velocity rate data from the rate bias update data and the momentum data.

7. The method of claim 4 further comprising the step of, repeating the recomputing and detecting steps for each of the hardware gyros respectively removed from the recomputing step.

8. The method of claim 4 further comprising the step of, indicating an anomaly of the received momentum data the norm of the parity vector is greater than the threshold when none of the detecting steps indicates a fault gyro.

9. The method of claim 4 wherein the computation step comprises the steps of,
orientation multiplying a gyro orientation matrix C with an pseudo inverse gyro orientation matrix $C^+$ for generating a combined orientation matrix $CC^+$,
subtracting the combined orientation matrix $CC^+$ from an identity matrix I for generating a correlation matrix $(I-CC^+)$,
data combining the pseudo gyro vehicular angular velocity rate data $\omega B$ and the hardware gyro vehicular angular velocity rate data $\omega BG$ into an angular velocity rate data vector $\omega c$,
correlation multiplying the correlation matrix $(I-CC^+)$ by the angular velocity rate data vector $\omega c$ for generating a parity vector (P), and
norm computing a norm of the parity vector (P).

10. The method of claim 4 wherein the recomputation step comprises the steps of,
orientation multiplying a gyro orientation matrix C with a pseudo inverse gyro orientation matrix $C^+$ for generating a combined orientation matrix $CC^+$,
matrix subtracting the combined orientation matrix from an identity matrix I for generating a correlation matrix $(I-CC^+)$,
data combining the pseudo gyro vehicular angular velocity rate data $\omega B$ and the hardware gyro vehicular angular velocity rate data $\omega BG$ into an angular velocity rate data vector $\omega c$,
correlation multiplying the correlation matrix $(I-CC^+)$ by the angular velocity rate data vector $\omega c$ for generating a correlation vector $(I-CC^+)\omega c$,
parity weighting the correlation vector $(I-CC^+)\omega c$ by a weighting matrix W for generating the parity vector, and
norm computing a norm of the parity vector (P).

11. The method of claim 4 further comprising the steps of,
repeating the recomputing and detecting steps for each of the hardware gyros respectively removed from the recomputing step, and,
adjusting a weighting matrix for successive removal from recomputation steps respective successive gyros,
wherein the recomputation step comprises the steps of:
orientation multiplying a gyro orientation matrix C with an pseudo inverse gyro orientation matrix $C^+$ for generating a combined orientation matrix $CC^+$;
matrix subtracting the combined orientation matrix from an identity matrix I for generating a correlation matrix $(I-CC^+)$;
data combining the pseudo gyro vehicular angular velocity rate data $\omega B$ and the hardware gyro vehicular angular velocity rate data $\omega BG$ into an angular velocity rate data vector $\omega c$;
correlation multiplying the correlation matrix $(I-CC^+)$ by the angular velocity rate data vector $\omega c$ for generating a correlation vector $(I-CC^+)\omega c$;
parity weighting the correlation vector $(I-CC^+)\omega c$ by a weighting matrix W for generating the parity vector; and
norm computing a norm of the parity vector (P).

12. A method of detecting a fault of one or more hardware gyros in a vehicle having momentum sensors, the method comprising the steps of,
receiving momentum data from the momentum sensors,
calculating pseudo gyro vehicular angular velocity rate data from the momentum data,
receiving hardware gyro vehicular angular velocity rate data from the hardware gyro,
computing a norm of a parity vector from the hardware gyro vehicular angular velocity rate data and the pseudo gyro vehicular angular velocity rate data, the computing step comprising the steps of: orientation multiplying a gyro orientation matrix C with a pseudo inverse gyro orientation matrix $C^+$ for generating a combined orientation matrix $CC^+$; subtracting the combined orientation matrix $CC^+$ from an identity matrix I for generating a correlation matrix $(I-CC^+)$; data combining the pseudo gyro vehicular angular velocity rate data $\omega B$ and the hardware gyro vehicular angular velocity rate data $\omega BG$ into an angular velocity rate data vector $\omega c$; correlation multiplying the correlation matrix $(I-CC^+)$ by the angular velocity rate data vector $\omega c$ for generating a parity vector (P); and norm computing a norm of the parity vector (P),
determining when the norm of the parity vector is greater than a threshold indicating a fault,
recomputing the norm of the parity vector with the hardware gyro vehicular angular velocity rate data of one of the gyro is removed from the recomputation of the parity vector, the recomputing step comprising the steps of: orientation multiplying a gyro orientation matrix C with a pseudo inverse gyro orientation matrix $C^+$ for generating a combined orientation matrix $CC^+$; matrix subtracting the combined orientation matrix from an identity matrix I for generating a correlation matrix $(I-CC^+)$; data combining the pseudo gyro vehicular angular velocity rate data $\omega B$ and the hardware gyro vehicular angular velocity rate data $\omega BG$ into an angular velocity rate data vector $\omega c$; correlation multiplying the correlation matrix $(I-CC^+)$ by the angular velocity rate data vector $\omega c$ for generating a correlation vector $(I-CC^+)\omega c$; parity weighting the correlation vector $(I-CC^+)\omega c$ by a weighting matrix W for generating the parity vector, and norm computing a norm of the parity vector (P),
detecting when the norm of the recomputed parity vector is less than the threshold indicating that the removed hardware gyro is faulty,
adjusting a weighting matrix for successive removal from recomputation steps respective successive gyros, and
repeating the recomputing and detecting steps for each of the hardware gyros respectively removed from the recomputing step.

13. The method of claim 12 further comprising the step of, indicating which one of the hardware gyros is faulty when detected in the detecting steps.

14. The method of claim 12 further comprising the step of, indicating faulty momentum data when a fault is determined and when none of the hardware gyros are detected as faulty.

* * * * *